United States Patent

Vogt et al.

[11] Patent Number: 6,148,615
[45] Date of Patent: Nov. 21, 2000

[54] METHOD FOR BOOST PRESSURE CONTROL OF AN INTERNAL COMBUSTION ENGINE

[75] Inventors: Bernhard Vogt, Boeblingen; Michael Baeuerle, Markgroenigen, both of Germany

[73] Assignee: Robert Bosch GmbH, Stuttgart, Germany

[21] Appl. No.: 09/274,580

[22] Filed: Mar. 23, 1999

[30] Foreign Application Priority Data

Mar. 24, 1998 [DE] Germany .................. 198 12 843

[51] Int. Cl.[7] ................................................. F02D 23/00
[52] U.S. Cl. ......................................................... 60/602
[58] Field of Search ............................................. 60/602

[56] References Cited

U.S. PATENT DOCUMENTS 4,748,567  5/1988  Sumizawa et al. .................. 60/602
4,781,027  11/1988  Richter et al. ...................... 60/602
5,782,092  7/1998  Schultalbers et al. ............... 60/602

FOREIGN PATENT DOCUMENTS 195 02 150  5/1996  Germany .

Primary Examiner—Noah P. Kamen
Attorney, Agent, or Firm—Kenyon & Kenyon

[57] ABSTRACT

In the boost pressure control system there is generated, from the system deviation between a reference boost pressure and an actual boost pressure, a manipulated variable for an actuator that acts on the exhaust flow guided through the turbine of an exhaust-driven turbocharger. To allow the boost pressure control system to operate over a wide working range without allowing the control action to become too slow or allowing control overshoots to occur, the manipulated variable, or one or more other variable(s) constituting the manipulated variable, is/are transformed in a characteristics map into values such that after transformation, a linear correlation exists between the manipulated variable and the controlled variable.

9 Claims, 2 Drawing Sheets

METHOD FOR BOOST PRESSURE CONTROL OF AN INTERNAL COMBUSTION ENGINE

FIELD OF THE INVENTION

The present invention relates to a method for boost pressure control of an internal combustion engine, there being generated, from the system deviation between a reference boost pressure and an actual boost pressure, a manipulated variable for an actuator that acts on the exhaust flow guided through the turbine of an exhaust-driven turbocharger.

BACKGROUND INFORMATION

A boost pressure control system is known, for example, from German Patent No. 195 02 150. A valve in a bypass of the exhaust-driven turbocharger turbine serves as the actuator for the boost pressure. The manipulated variable for the bypass valve is generated by a PID controller which generates a proportional component, a differential component, and an integral component for the manipulated variable. It defines for the integral component a limit value which is derived from operating parameters of the internal combustion engine.

As a rule, a bypass valve for the exhaust-driven turbocharger turbine is used as the actuator. A device which changes the turbine geometry can also, however, be used as the actuator. With all these actuators, especially with a bypass valve that is controlled or regulated via a spring-loaded pressure capsule in conjunction with an electropneumatic timing valve, there exists a nonlinear correlation between the boost pressure generated by the turbocharger and the manipulated variable for the actuator. This nonlinear relationship may be ignored as long as the working point of the boost pressure controller shifts only within very narrow limits. In this case the boost pressure as a function of the manipulated variable can be regarded as almost linear. If, however, the working range of the boost pressure controller should not be confined only to a very narrow working range, but rather if a wide working range, i.e. a large variation range for the manipulated variable, is required, then with a greater displacement of the working point on the one hand the control action becomes too slow, and on the other hand overshoots occur in the control system. If the same turbocharger components are to be used in engines with different outputs, it is mandatory that the boost pressure controller be designed for a wide working range.

It is therefore an object of the present invention to provide a method with which the boost pressure controller can be operated over the widest possible working range without resulting in any slowing of the control action or overshoots in the control system.

SUMMARY OF THE INVENTION

The manipulated variable for an actuator which acts on the exhaust flow guided through the turbine of an exhaust-driven turbocharger, or one or more other variable(s) constituting the manipulated variable, is/are transformed in a characteristics map into values such that, after transformation, there exists an at least approximately linear correlation between the manipulated variable and the controlled variable (the boost pressure). This action yields a linear control curve which allows rapid and stable boost pressure control regardless of the location of the working point.

The manipulated variable can be formed from a proportional component and/or a differential component and/or an integral component. It is advantageous to define for the integral component a limit value which is ascertained from a basic value that depends on multiple operating parameters of the internal combustion engine, and from a correction value superimposed thereupon which is determined adaptively as a function of engine speed, multiple speed ranges being predefined.

Instead of the manipulated variable itself, it is also possible for the proportional component, the differential component, the integral component, and/or the limit value for the integral component to be transformed in a characteristics map.

DETAILED DESCRIPTION

Figure 1:
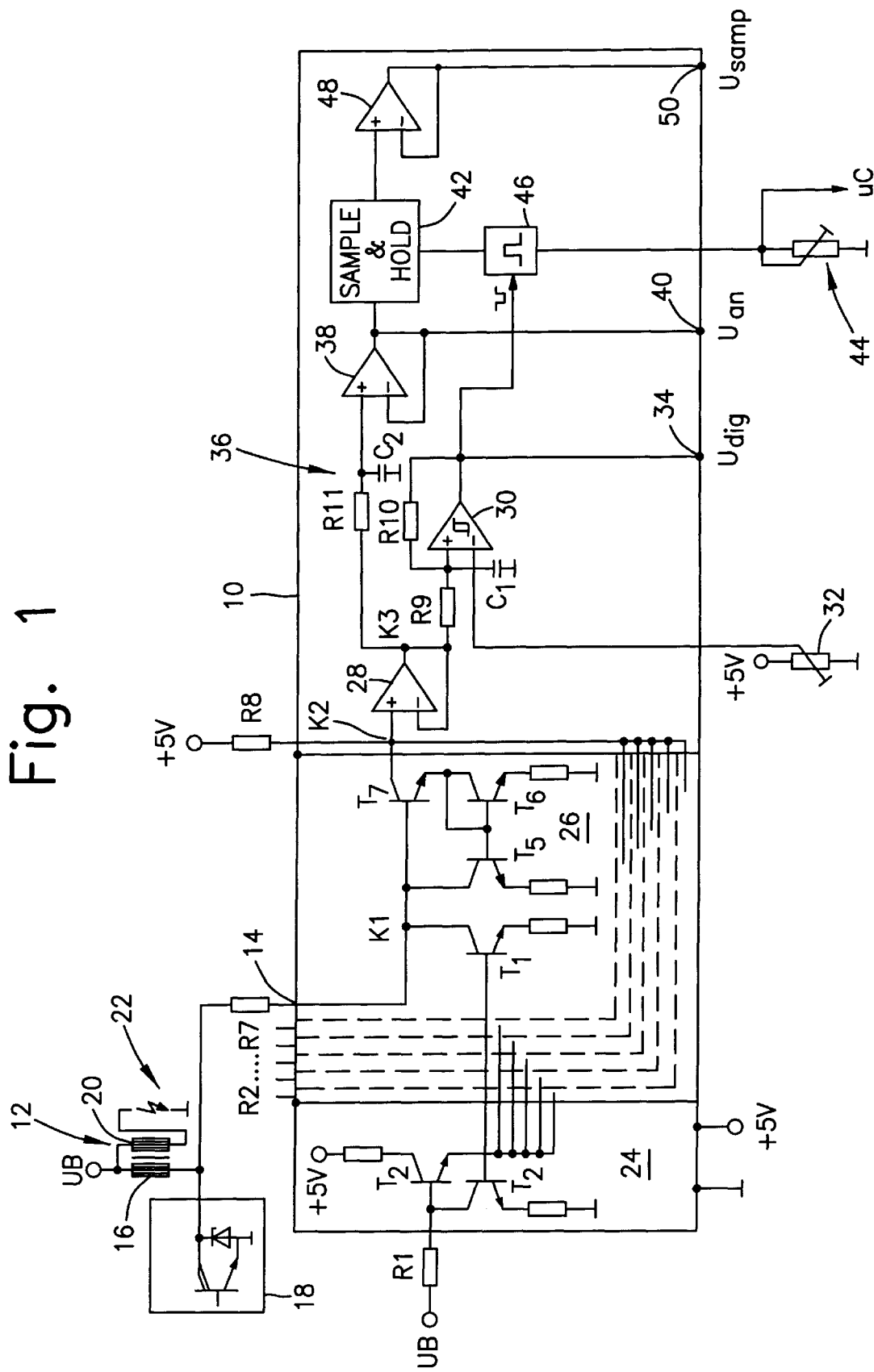
FIG. 1 shows a block diagram of an engine having a boost pressure control system.

FIG. 1 shows an internal combustion engine 10 having an intake duct 12 and an exhaust conduit 13. Located in intake duct 12 is a throttle valve 14 and a sensor 15 for sensing the opening angle α of throttle valve 14. Also arranged in intake duct 12, on the downstream side of throttle valve 14, is a pressure sensor 16 for sensing the actual boost pressure pvdk. A rotation speed sensor 17 for sensing the engine speed nmot is mounted on internal combustion engine 10. Internal combustion engine 10 is equipped with a turbocharger, an exhaust-driven turbine 18 being arranged in exhaust conduit 13, and a compressor 19 in intake duct 12. Compressor 19 is driven via a shaft 11 (indicated by a dashed line) by exhaust-driven turbine 18. Exhaust-driven turbine 18 is bypassed in known fashion by a bypass line 20 in which a bypass valve 21 is arranged. Bypass valve 21 is activated in known fashion via a spring-loaded pressure capsule in conjunction with an electropneumatic timing valve. The spring-loaded pressure capsule with the electropneumatic timing valve is symbolized in FIG. 1 by block 22.

A further controller 23 (described in more detail below), which receives as input signals the throttle valve opening angle α, the measured actual boost pressure pvdk, and the engine speed nmot, generates a manipulated variable ldtv for bypass valve 21. More precisely, manipulated variable ldtv, in the form of a pulse-width modulated signal, controls the electropneumatic timing valve, which for its part generates the pressure for the spring-loaded pressure capsule, which in turn acts on the bypass valve. The exhaust flow through turbine 18 can also be controlled by changing the turbine geometry.

An example of a controller 23 will be described below with reference to FIGS. 2, 3, and 4. A PID controller is described here, but any other controller type can also be used.

Figure 2:
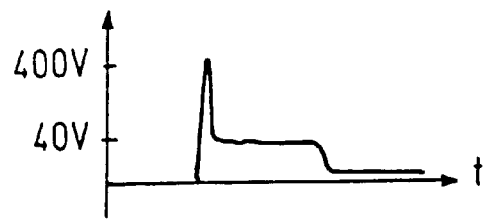
FIG. 2 shows a functional diagram of a boost pressure controller.

As is evident from the functional diagram in FIG. 2, a reference boost pressure plsol is read out from a characteristics map KFLDPS as a function of the engine speed nmot and throttle valve position α. In addition, the actual boost pressure pvdk is measured using a pressure sensor in front of the throttle valve. The difference between the reference boost pressure plsol and actual boost pressure pvdk is determined at a node V1. This difference is referred to as the system deviation lde. If the condition B_ldr for activation of the boost pressure control system exists, a switch is S1 is set to the output of node V1 so that this difference between the reference boost pressure plsoll and the actual boost pressure pvdk is present at the output of switch S1 as the system deviation lde. If the boost pressure control system is not active, i.e. if the condition B_ldr does not exist, switch S1 is set to 0.0. In this case the system deviation lde is thus zero.

A threshold value decider SE1 applies a logical "1" to input S of an SR flip-flop FF if the system deviation lde exceeds a threshold UMDYLDR. Input R of SR flip-flop FF is connected to the output of a comparator K1. This comparator K1 delivers a logical "1" if the system deviation lde is less than or equal to 0.0. Under these conditions, a logical "1" is present at output Q of SR flip-flop FF if the system deviation lde exceeds the threshold UMDYLDR, i.e. if a transition is occurring from steady-state to dynamic operation. If a logical "1" is preset at input R of SR flip-flop FF, i.e. if the system deviation lde is less than 0 (the actual boost pressure is greater than the reference boost pressure), flip-flop FF is then reset, and a logical "0" is present at its output Q. The output signal B_lddy at output Q of flip-flop FF indicates whether dynamic operation (logical "1") or steady-state operation (logical "0") is present.

In functional block R1, a proportional control parameter ldrkp, a differential control parameter ldrkd, and an integral control parameter ldrki are ascertained as a function of the operating condition B_lddy and the engine speed nmot. The determination of controller parameters ldrkp, ldrkd, and ldrki in functional block R1 is further described below with reference to FIG. 3.

Forming the product of the proportional controller parameter ldrkp with the system deviation lde in multiplier V2 yields a proportional component ldptv for the manipulated variable ldtv of the turbocharger.

A differential component ldrdtv of the manipulated variable ldtv results from forming the product, in multiplier V3, of the differential control parameter ldrkd and the offset between the current system deviation lde and the system deviation lde(l−1) ascertained one cycle (approx. 50 ms) earlier. The difference between the current system deviation lde and the previously determined system deviation lde(l−1) is determined in node V4. A delay element VZ1 furnishes the system deviation lde(l−1) delayed by one cycle.

The integral component lditv of manipulated variable ldtv is formed by an integrator INT which calculates the product of the integral control parameter ldrki and the delayed system deviation lde(l−1), and superimposes that product on the integral component lditv(l−1) determined in the previous cycle.

Lastly, the proportional component ldptv, the differential component ldrdtv, and the integral component lditv are added at node V5, yielding the manipulated variable ldtv for a bypass valve of the turbocharger.

The integral component lditv has an upper limit imposed on it in order to prevent overshoots in the boost pressure control system. The limit value ldimx for the integral component lditv is ascertained in a circuit block R2 (described below with reference to FIG. 4), specifically as a function of the system deviation lde, the integral component lditv, the reference boost pressure plsoll, the engine speed nmot, and the ratio vrlsol between the reference charge and maximum charge of the cylinders.

Figure 3:
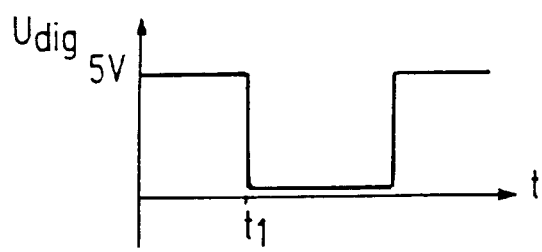
FIG. 3 shows a functional diagram for ascertaining control parameters.

Functional block R1 depicted in FIG. 3 contains three families of characteristic curves LDRQ1DY, LDRQ1ST, and LDRQ2DY dependent on the engine speed nmot. If the condition B_iddy for dynamic operation is present, the integral controller parameter ldrki from characteristic curve LDRQ1DY for dynamic operation is switched through to the output by switch S2. The differential controller parameter ldrkd is switched through by switch S3, from characteristic curve LDRQ2DY, to the output. The proportional controller parameter ldrkp is created by taking the difference, at node V6, between a fixed value LDRQ0D that is switched by a switch S4 to node V6, and the differential controller parameter ldrkd. If the condition B_lddy for dynamic operation is not present, but instead the machine is in steady-state mode, then the integral controller parameter ldrki is taken from the characteristic curve LDRQ1ST; switch S2 is now correspondingly set to the characteristic curve LDRQ1ST. The differential controller parameter ldrkd is set via switch S3 to 0.0, and the proportional controller parameter ldrkp is set by switch S4 to a fixed value LDRQ0S. The fixed values LDRQ0D, LDRQ0S, and the characteristic curves LDRQ1LDY, LDRQ1ST, and LDRQ2DY are applied, by way of experiments on the engine test stand, so that boost regulation is optimized in the dynamic and steady-state operating modes.

Figure 4:
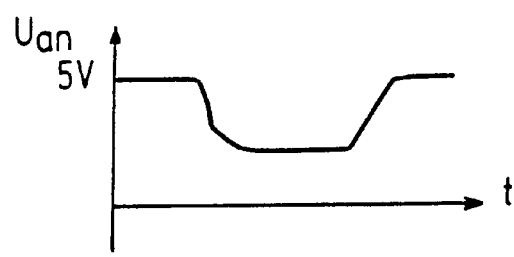
FIG. 4 shows a functional diagram for ascertaining a limit value for an integral component of a boost pressure manipulated variable.

FIG. 4 depicts functional block R2, which derives the limit value ldimx for the integral component lditv from the engine speed nmot, the reference boost pressure plsol, the system deviation lde, the ratio vrlsol between the reference charge and maximum charge of the cylinders, and the integral component lditv of the manipulated variable.

The limit value ldimx is made up of a basic value ldimxr and a correction value ldimxak superimposed on it at node V8. In addition, another predefined value LDDIMX can be added to the limit value ldimx at node V9. This value LDDIMX corresponds to a small fraction (approx. 0–5%) of the limit value ldimx, which ensures that the value in no circumstances falls below that small value. If the current integral component is greater than the limit value without the value LDDIMX (which represents a safety clearance), then the boost pressure can be spontaneously controlled even without raising the limit value, provided the boost pressure deviation that is to be controlled out does not require values greater than LDDIMX.

A limiting stage BG1 limits the limit value ldimx to a predefinable value TVLDMX which corresponds, for example, to 95% of the duty factor of the manipulated variable for the boost pressure control system.

The current correction value ldimxak for the limit value ldimx appears at the output of a summing unit SU. In this summing unit SU, the correction value present at its input 1 is, under certain conditions, either decreased in steps or increased in steps.

The following conditions must be met in order for a stepwise decrease in the correction value to be performed in summing unit SU:

The boost control system must be active, i.e. the condition B_ldr must be present; and the current limit value ldimx must not lie at the upper or lower end of limiting stage BG1. Both data are present at the inputs of an AND gate AN1, which delivers a logical "1" to a further AND gate AN2 if these two conditions are met. A further condition is that the absolute value of the system deviation lde must be less than a threshold LDEIA. For this, the system deviation lde is conveyed to an absolute value generator BB and then to a threshold value decider SE2, which delivers at its output a logical "1" to AND gate AN2 if the absolute value of the system deviation lde is below the threshold LDEIA. This threshold LDEIA is almost zero.

In addition, a check is made in a threshold value decider SE3 as to whether the ratio vrlsol between the reference charge and maximum charge of the cylinders lies above a threshold LDRVL. If so, the engine is operating at full load, and threshold value decider SE3 delivers a logical "1" to an input of AND gate AN2.

The last condition to be met would be that the integral component lditv be less than the limit value ldimx. A comparator K2 accordingly compares the integral component lditv of the manipulated variable and the limit value ldimx prior to node V9. A logical "1" appears at the output of comparator K2 if the integral component lditv is greater than the limit value ldimxr. The output signal of comparator K2 passes via an inverter NOT to an input of AND gate AN2. A logical "1" is thus applied to this input of AND gate AN2 if the integral component lditv is less than the limit value ldimx.

If all of these conditions are met, a logical "1" is present at the output of AND gate AN2. This condition B__ldimxn for negative stepwise follow-up of the correction value in summing unit SU is delayed in a delay element VZ2 by a fixed debounce time TLDIAN and sent to a switch S5 and an OR gate OR1. If the condition B__ldimxn for negative stepwise follow-up of the limit value exists, switch S5 connects input 4 of summing unit SU to a read-only memory SP1 in which the increment LDDIAN for negative follow-up of the limit value is stored. If the condition B__ldimxn is not met (corresponding to a logical "0" at the output of AND gate AN2), switch S5 then switches over to a memory SP2 in which the increment LDDIAP for positive follow-up of the limit value is stored.

The following three conditions must be met for stepwise positive follow-up of the limit value:

As was already the case for negative stepwise follow-up, a logical "1" must be present, as described above, at the output of AND gate AN1.

In addition, the system deviation lde must be greater than zero; even a very small deviation from zero is sufficient. A threshold value decider SE4 generates a logical "1" at its output if this condition is met.

Lastly, the current integral component lditv of the manipulated variable must be greater than the current limit value ldimx. As already described previously, this condition is checked with comparator K2.

The output of this comparator K2 as well as the output of threshold value decider SE4 and the output of AND gate AN1 are applied to an AND gate AN3. A logical "1" is present at its output if the three conditions cited above are met.

The output signal of AND gate AN3 (the condition B__ldimxp for stepwise positive follow-up of the correction value) is sent through a delay element VZ3 whose delay time is equal to a debounce time that is taken from a characteristic curve TLDIAPN dependent on the engine speed nmot. The condition B__ldimxn for negative stepwise follow-up of the limit value, and the condition B__ldimxp for positive stepwise follow-up, are both applied to the inputs of OR gate OR1. Its output signal, which is present at input 2 of summing unit SU, signals to summing unit SU whether a positive or negative stepwise follow-up of the limit value present at its input 1 is to be performed.

The correction value ldimxak present at the output of summing unit SU is also sent to an input 5 of a functional block AS, in which an adaptation of the correction value is accomplished. This adaptation is performed only if on the one hand full-load operation of the machine is present, and on the other hand if the condition for a positive or negative stepwise follow-up of the correction value is met. A datum regarding full-load operation can be picked off at the output of threshold value decider SE3 (described above). The information as to whether a positive or negative stepwise follow-up of the correction value is being accomplished can be derived from the output signal of OR gate OR1. Both the output signal of threshold value decider SE3 and the output signal of OR gate OR1 are conveyed to the inputs of an AND gate AN4. If these two conditions are met, the output signal B__ldimxa of AND gate AN4 is a logical "1". The condition B__ldimxa for adaptation of the correction value is present at input 6 of functional block AS. Whenever the condition B__ldimxa=1 is met, the current value of the summing unit SU is transferred into a corresponding memory cell of functional block AS, in which a plurality of values reproducing an adaptation characteristic curve are stored.

The interpolation points stldea for adaptation of the correction value in functional block AS are supplied by a functional block R3. Functional block R3 also delivers a datum B__stldw concerning interpolation point changes.

Either the adapted correction value ldimxa from the output of functional block AS, or an adapted correction value ldimxaa in which sudden changes occurring in the negative direction have been limited to a minimum value, is conveyed to an input 1 of summing unit SU to form the correction value ldimxak. The decision between the adapted correction value ldimxa and the limited adapted correction value ldimxaa is made via a switch S6. Switch S6 switches to the non-limited adapted correction value ldimxa as activation of the boost pressure control system begins, i.e. immediately after the appearance of a rising edge of condition B__ldr for boost pressure control. The rising edge of the signal B__ldr is detected by a flip-flop AF. Otherwise switch S6 is located in the other position, and sends the limited adapted correction value ldimxaa to input 1 of summing unit SU.

An input 3 of summing unit SU receives from the output of an OR gate OR2 the information as to whether a rising edge of the boost pressure activation signal B__ldr is present, or whether the signal B__stldw is signaling an interpolation point change in functional block R3.

The limited adapted correction value ldimxaa is formed as follows. In a node V10, the current correction value ldimxak output by summing unit SU is subtracted from the adapted correction value ldimxa present at the output of functional block AS. The difference signal ldimxad is conveyed to a limiting stage BG2. Limiting stage BG2 limits sudden negative changes in the difference signal ldimxad to a predefined limit value LDMXNN. The limited difference signal ldimxab at the output of limiting stage BG2 is added, in node V11, back to the current correction value ldimxak, so that from that, the limited adapted correction value ldimxaa is ultimately created.

Figure 5:
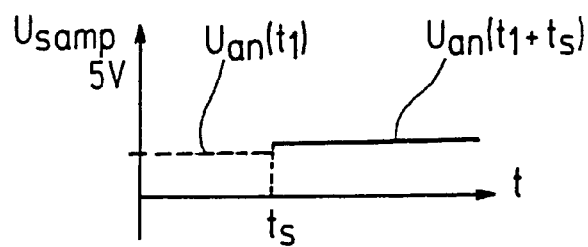
FIG. 5 shows a control curve.

FIG. 5 depicts the profile a of a control characteristic curve. The curve shows the dependence of the controlled variable (the boost pressure pvdk) on the manipulated variable ldtv. Characteristic curve a normally has a nonlinear profile caused principally by the actuator, having an electropneumatic timing valve, a spring-loaded pressure capsule activated thereby, and the bypass valve actuated by the latter.

Because of its nonlinearity, characteristic curve a has different slopes at working points A1 and A2 located far apart from one another, as indicated in FIG. 5. If the controller were set, for example, to working point A1, then a change in the manipulated variable by a value Δldtv would cause a boost pressure change Δpvdkl of 40 millibars. If a working point shift to A2 then occurred, that same change Δldtv in the manipulated variable would cause a much greater change in the boost pressure, by a value Δpvdk2 of approximately 220 millibars. In the event of a working point shift from A1 to A2, an overshoot of approximately 180 millibars would thus occur in the boost pressure regulation system. An undesirable effect of this kind can be avoided by transforming the nonlinear characteristic curve a into a linear characteristic curve b. With a linear characteristic curve b, a change in the manipulated variable ldtv by a value Δldtv would cause the same change in boost pressure.

Linearization of the control characteristic curve can be achieved by the following action:

As depicted in FIG. 2, the manipulated variable ldtv at the output of node V5 is sent to a characteristics map KFLD. In this characteristics map KFLD, the manipulated variable ascertained by the controller is transformed, for each possible working point, into a value such that a linear correlation ultimately exists between the transformed values of the manipulated variable ldtv and the boost pressure pvdk. The transformation values derived during application of the controller from the known nonlinear characteristic curve a are stored in the characteristics map KFLD so that during normal operation of the controller, each calculated value of the manipulated variable can have a corresponding transformed value assigned to it.

Instead of the characteristics map KFLD for transformation of the manipulated variable ldtv, it is also possible to transform the proportional component ldptv resulting in the manipulated variable ldtv in a characteristics map KFPT, and/or the differential component ldrdtv in a characteristics map KFDT, and/or the integral component lditv in a characteristics map KFIT. All the characteristics maps KFPT, KFDT, KFIT can also be combined in a single characteristics map. In addition to these characteristics maps, the characteristics map KFLD for the resulting manipulated variable ldtv can also be present. A further alternative is to transform the maximum value ldimx for the integral component lditv in a characteristics map KFMX. The characteristics maps KFLD, KFPT, KFDT, KFIT, KFMX listed above can be provided alone or in combination with others; in any event they are to be applied in such a way that ultimately an at least approximately linear correlation exists between the manipulated variable ldtv and the boost pressure pvdk.

What is claimed is:

1. A method for controlling a boost pressure of an internal combustion engine, comprising the steps of:

determining an actual boost pressure of the internal combustion engine;

determining a deviation between a reference boost pressure and the actual boost pressure;

generating, as a function of the deviation, a manipulated variable for an actuator acting on an exhaust flow guided through a turbine of an exhaust-driven turbocharger; and transforming, in a characteristics map, at least a part of the manipulated variable into at least one value to provide an at least approximately linear correlation between the manipulated variable for the actuator acting on the exhaust flow guided through the turbine and the actual boost pressure of the internal combustion engine.

2. The method according to claim 1, wherein the at least a part of the manipulated variable includes at least one additional variable constituting the manipulated variable.

3. The method according to claim 1, wherein the at least a part of the manipulated variable is the manipulated variable.

4. The method according to claim 1, wherein the at least a part of the manipulated variable includes at least one of:

a proportional component of the manipulated variable, a differential component of the manipulated variable, and an integral component of the manipulated variable.

5. The method according to claim 4, further comprising the step of:

ascertaining a limit value for the integral component as a function of a basic value that depends on a plurality of operating parameters of the engine and of a superimposed correction value determined adaptively as a function of a speed of the engine, a plurality of speed ranges being predefined.

6. The method according to claim 5, further comprising the step of:

transforming the limit value in the characteristics map.

7. The method according to claim 1, wherein the turbine has an internal geometry that may be changed to control the exhaust flow through the turbine.

8. A method for controlling a boost pressure of an internal combustion engine comprising the steps of:

determining an actual boost pressure of the internal combustion engine;

determining a deviation between a reference boost pressure and the actual boost pressure;

generating, as a function of the deviation, a manipulated variable for adjusting the variable internal geometry of a turbine of an exhaust-driven turbocharger; and transforming, in a characteristics map, at least a part of the manipulated variable into at least one value to provide an at least approximately linear correlation between the manipulated variable for adjusting the variable internal geometry of a turbine of an exhaust-driven turbocharger and the actual boost pressure of the internal combustion engine.

9. A method of linearizing the characteristic curve of a controller used to control an exhaust-driven turbocharger comprising the steps of:

sending a manipulated variable from an output node to a characteristics map;

transforming, for a working point, the manipulated variable within the characteristics map into a transformation value that establishes a linear correlation between the manipulated variable and a boost pressure;

storing the transformation value in the characteristics map; and accessing the stored transformation value in the characteristics map during normal operation of the controller.

* * * * *